United States Patent [11] 3,550,899

| [72] | Inventor | John Robert Clarkson |
| | | Palo Alto, Calif. |
| [21] | Appl. No. | 849,563 |
| [22] | Filed | July 23, 1969 |
| [45] | Patented | Dec. 29, 1970 |
| [73] | Assignee | The J. R. Clarkson Company |
| | | Palo Alto, Calif. |
| | | a corporation of California |
| | | Continuation of application Ser. No. |
| | | 561,121, June 28, 1966, now abandoned. |

[54] COLLAPSIBLE TUBE
6 Claims, 3 Drawing Figs.

[52] U.S. Cl.................................................... 251/5,
137/93, 138/45, 285/236
[51] Int. Cl........................................................ F16k 7/07
[50] Field of Search...................................... 285/(Inquired)

[56] References Cited
UNITED STATES PATENTS
2,760,436  8/1956  Von Seggern.................

2,982,511  5/1961  Connor.......................
2,995,335  3/1961  Raftis..........................
3,090,591  5/1963  Clarkson.....................

FOREIGN PATENTS
589,585  12/1959  Canada.......................
132,054  6/1951  Sweden......................

Primary Examiner—William F. O'Dea
Assistant Examiner—Richard Gerard
Attorney—Strauch, Nolan, Neale, Nils & Kurz ABSTRACT: A valve assembly adapted to be introduced between opposed adjacent rigid conduit open ends comprises two concentric relatively thick-walled tubes formed primarily of elastomeric material with an annular inwardly open recess in the outer tube extending around the inner region of the inner tube to form an annular fluid pressure chamber. The outer regions of said tubes having a close peripheral fit with each other and are clamped fluid tight upon the respective opposed conduit ends. Fluid under pressure is selectively introduced into the chamber for elastically constricting the inner region of said inner tube to restrict fluid flow through the valve assembly, and internal reenforcement is provided in the outer tube so that the outer tube undergoes substantially no radial expansion during normal operating pressures within the chamber.

PATENTED DEC 29 1970

3,550,899

INVENTOR
JOHN R. CLARKSON

BY
Strauch, Nolan, Neale, Nies & Bronaugh
ATTORNEYS

COLLAPSIBLE TUBE

This application is a continuation of Ser. No. 561,121 filed June 28, 1966, and now abandoned.

VALVE

The present invention relates to improvements in valves and more particularly to pressure-operated flow control and shut-off valves. In one embodiment of the present invention, a flow control valve of the radially constrictable unobstructed venturi-type is provided whereas in the other embodiment of the present invention a pressure-operated pinch-type valve is provided.

A typical example of the prior art radially constrictable unobstructed venturi valves may be found in U.S. Pat. No. 3,090,591 issued May 21, 1963 for "Flow Control Valve" of J. R. Clarkson, the applicant herein. Typical examples of prior art pressure-operated pinch valves may be found in Vickers U.S. Pat. No. 2,716,575 issued Aug. 30, 1955 for "Constriction Valve for Fluidized Solids" and in Connor U.S. Pat. No. 2,982,511 issued May 2, 1961 for "Pressure Operated Control Valve."

In the control valve form of the present invention, there is provided a valve which, from the operating viewpoint, obtains substantially the same control effect as that achieved by the structure shown in the aforesaid Clarkson patent, but which is much simpler and less expensive in construction, much simpler to install, and which may be operated by both pneumatic as well as hydraulic pressure thereby being readily adapted for use in instrument control fluid circuits.

The pinch valve form of the present invention represents an improvement over the prior art such as illustrated in Vickers and Connor aforesaid in that it is much simpler and less expensive in construction and installation than the prior fluid pressure-operated pinch valves which utilized rigid metallic external casings while providing immediate and direct correlation between the applied pressure and the valve-closing action, a condition which is extremely important in automatic control but which is not capable with prior art construction such as that of Connor.

With the foregoing considerations in view it is the primary object of the present invention to provide a fluid pressure-operated valve formed by a pair of coaxial thick-walled annular tubes each formed primarily of elastomeric material and one disposed within the other and defining therebetween at their central regions an annular chamber about the inner tube in which the pressure can be controlled to apply a uniformly distributed pressure on the inner tube central region to control the size of the opening therethrough and in which the outer tubing is so constructed that there is no material expansion of the outer tube in response to variations in the pressure within the annular chamber.

A subsidiary object of the present invention is to provide a pressure-operated control valve of the foregoing type which is a radially constrictable unobstructed venturi valve.

A further subsidiary object of the present invention is to provide a valve of the foregoing type the inner tube of which is internally reinforced to preclude radial expansion thereof in response to elevated pressures within the bore thereof.

These and other objects of the present invention will become more fully apparent by reference to the appended claims and as the following detailed description proceeds in reference to the accompanying drawings wherein:

FIRST EMBODIMENT

Figure 1:
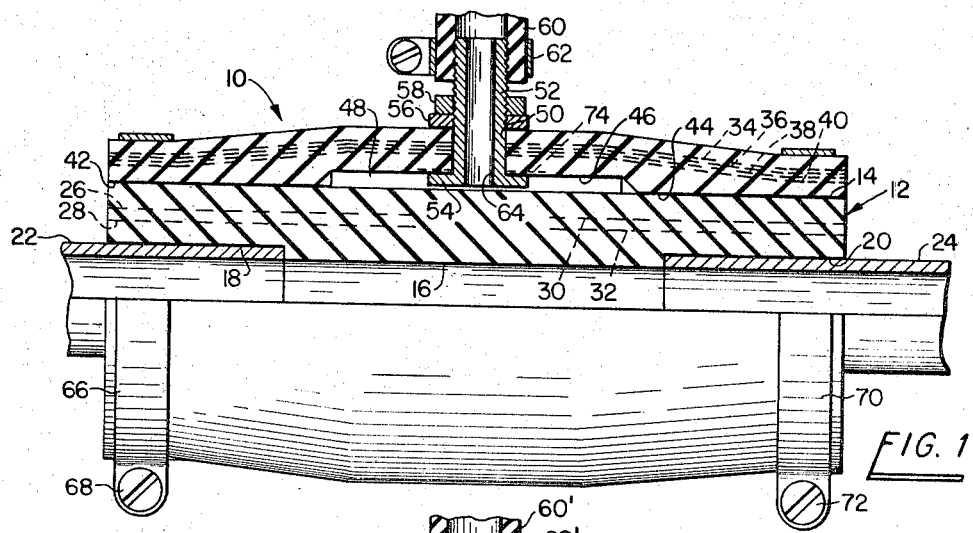
FIG. 1 is a scale drawing in half section of a radially constrictable unobstructed venture valve embodying the principles of the present invention.

Referring now to the drawings and particularly to FIG. 1, the first embodiment of the present invention comprises an outer tubular member 10 and an inner tubular member 12 disposed coaxially within and substantially coextensive in length with the outer tube 10. The inner tube, in its preferred form, has in its undistorted configuration an exterior cylindrical surface 14, an internal cylindrical surface 16 in the central region thereof and cylindrical surfaces 18 and 20 coaxial with and of slightly greater diameter than the internal surface 16 at its opposite ends.

As is apparent from FIG. 1, tube 12 is adapted to be interposed between the spaced ends of a pair of coaxially aligned rigid conduits 22 and 24, the length of the surface 16 being equal to the spacing between the ends of the conduits 22 and 24, the diameter of the surface 16 being substantially equal to the internal diameter of the conduits 22 and 24 and the diameters of the surfaces 18 and 20 being substantially equal to the external diameters of the conduits 22 and 24.

Tube 12 is provided in its end regions with annular bands of fabric-reinforcing material 26 and 28 and 30 and 32. The central portion of the tube 12 between the ends of the annular bands of reinforcing material 26—32 is free of reinforcing material so that, upon the application of a uniformly distributed circumferential constricting force to the central region of the tube 12 it can constrict radially to a substantial degree to provide in effect a venturi passage between the ends of the conduits 22 and 24 to thereby control the flow therethrough without departing from the circularity of the opening through tube 12. As is explained in the aforesaid Clarkson patent, for control purposes this ability to constrict the port opening while maintaining its circularity is of critical importance for control purposes in that departures from circularity introduced turbulence disturbing the relation between the applied circumferential pressure and the flow rate through the opening in the tube thereby rendering control unpredictable.

Tube 12, apart from the bands of fabric reinforcement 26 through 32, is formed of elastomeric material. The particular elastomeric material selected depends, as explained in the aforesaid Clarkson patent, upon the particular application involved. Where natural or pure gum rubber can be used without contamination of the material passing through the valve or excessively rapid deterioration, it is preferred. Where natural or pure gum rubber cannot be used, a suitable synthetic rubber is preferred.

The outer tube 10 is an annular body of elastomeric material having annular reinforcing material, preferably in the form of four-ply square woven fabric as indicated at 34, 36, 38 and 40. Internally tube 10 has at its opposite ends cylindrical surfaces 42 and 44 which are dimensioned to have a substantially size to size fit with the external surface of the aligned portion of the tube 12. The central region of tube 10 is formed with an internal surface 46 of larger diameter than the external surface of the aligned portion of the tube 12 to thereby define therebetween, in the undeformed form of the tubes 10 and 12, an annular chamber 48 about the central region of the tube 12. A radial opening 50 is formed through the wall of the tube 10. A tubular fitting 52 is mounted in the opening 50 as illustrated in FIG. 1, having a radial flange 54 disposed within the chamber 48 and a threaded shank externally of the tube 10 upon which is received a washer 56 and a nut 58. When the nut 58 is tightened, the portion of the tube 10 surrounding the aperture 50 is compressed between the washer 56 and the flange 54 and against the exterior surface of the fitting 52 to thereby form a fluidtight seal therebetween. A flexible tube 60 may be fitted over the end of the fitting 52 and secured in fluidtight relation thereto by a clamp band 62 so that the chamber 48 may be connected in fluid communication through the bore 64 of the fitting 52 and the tube 60 to a controlled source of pneumatic or hydraulic pressure whereby the pressure in the chamber 48 may be selectively varied to control the degree of constriction of the size of the central portion of the tube 12.

The internal reinforcement of the tube 10 provided by the multiply square woven fabric 34—40 precludes any material radial expansion of the tube 10 in response to increases in the fluid pressure within the chamber 48 so that any increase in the pressure within the chamber 48 is immediately and directly effective to produce a radially inwardly uniformly circumferentially distributed constricting force upon the central region of the tube 12 to thereby provide direct correlation between the applied pressure in chamber 48 and the size of the opening provided between the ends of the conduits 22 and 24 by the surface 16 of the tube 12.

Fluidtight seals between the surface 18 and the exterior surface of the conduit 22 and between the surfaces 14 and 42 are provided by a contractible metal band 66, the size of which is variable by rotation of the bolt 68. Fluidtight seals are similarly provided between the surface 20 and the exterior surface of the conduit 24 and between the surfaces 14 and 44 by a contractible metal band 70 the size of which is variable by actuation of a bolt 72.

By way of a practical example of the valve of the form illustrated in FIG. 1, for ½ inch valve, the overall length of the tube 12 may be 5 inches, the external diameter of the tube 12 may be 1 9/16 inch, the diameter of the surfaces 18 and 20 may be 27/32 inch, the diameter of the surface 16 may be .62 inch, the length of the surfaces 18 and 20 may be 1¼ inch, the length of the surface 16 may be 2½ inches, the axial length of the fabric bands 26—32 may be 2 inches, and the spacing between the band 28 and the surface 18 and the band 32 and the surface 20 may be ⅛ inch minimum. For the ½ inch valve size, the diameter of the surface 42 and 44 may be 1 19/32 inch, the diameter of the surface 46 may be 1 13/16 inch, the length of the surfaces 42 and 44 may be 1 7/16 inch, the overall length of the tube 10 may be 5 inches, the diameter of the opening 50 may be ⅝ inch, and the radial thickness of the tube 10 at its opposite ends may be ¼ inch and the external diameter of the tube 10 at its central region may be 2⅝ ⅜inch.

To minimize wear on the tube 10, supplemental fabric reinforcement is provided within the tube 10 about the opening 50 adjacent the flange 54 as is indicated at 74.

The material of which the tube 10 is formed, apart from the fabric reinforcement 34—40, is a suitable wear resistant elastomeric material such as synthetic neoprene rubber.

SECOND EMBODIMENT

Figure 2:
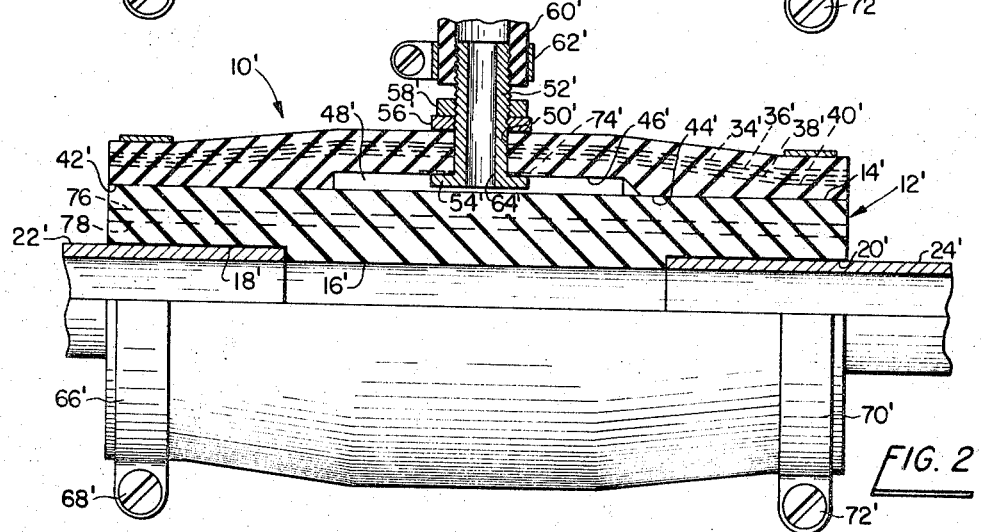
FIG. 2 is a similar view, not to scale, of a larger valve embodying certain of the principles of the present invention.

The second embodiment of the present invention is illustrated in FIG. 2. This is, apart from dimensional differences which will be set forth presently, structurally identical with the embodiment of FIG. 1 with one exception. Accordingly the corresponding parts of the two embodiments have been assigned like reference numerals with the reference numerals used on the second embodiment of FIG. 2 having prime marks added thereto. No detailed description will be given of the embodiment of FIG. 2 except to point out this exception and to explain the difference in operation.

The difference in construction between the two embodiments is that the internal reinforcement of the tube 12' is continuous from end to end there being two annular bands of fabric reinforcement 76 and 78 which extend throughout the entire length of the tube 12'. This construction is necessary in the large diameter sizes of the valve of this type. This construction is preferred for valves in the sizes 1¼ inch through 4 inches.

By way of a practical example, for a 3 inch valve of the form of FIG. 2, the overall length of the tube 12' is in the order of 14 inches, the external diameter of the tube 12' is 19/32 inch, the diameter of the surfaces 18' and 20' is 3½ inches, the diameter of the surface 16' is 3.068 inches, the length of the surfaces 18' and 20' is 2⅞ inches, and the spacing between the surfaces 18' and 20' and the fabric band 78 is ⅛ inch minimum. For the 3 inch valve, the overall length of the tube 10' is 14 inches, the internal diameter of the surfaces 42' and 44' is 4 21/32 inches, the axial length of the surfaces 18' and 44' is 4 13/16 inches, the diameter of the surface 46' is 5.500 inches, the radial thickness of the tube 10' at its opposite ends is ½ inch, and the external diameter of the central portion of the tube 10' is 6½ inches.

APPLICATION

Figure 3:
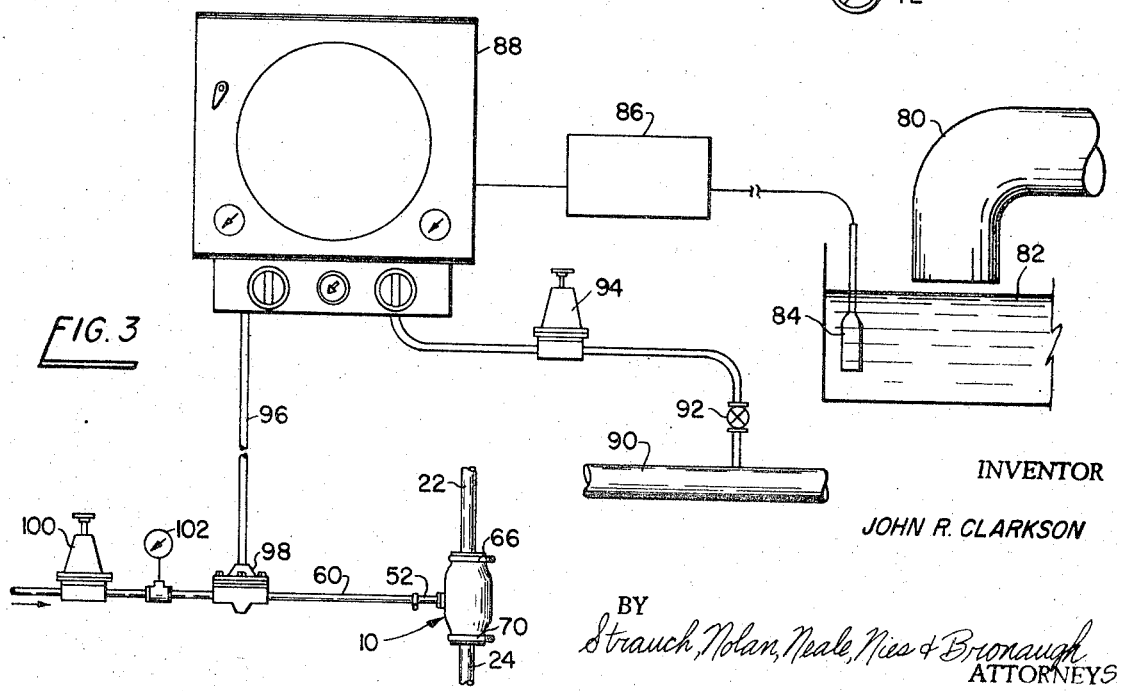
FIG. 3 is a diagram illustrating a typical use of the valves illustrated in FIGS. 1 and 2.

FIG. 3 illustrates a typical application of the valves of FIGS. 1 and 2. The system illustrated in FIG. 3 is a $pH$ control system used in a copper concentrator. In this system, the overflow pipe 80 from a hydro-cyclone (not shown) discharges into a reservoir 82. The $pH$ of the liquid in the reservoir 82 is sensed by a $pH$ probe 84 which transmits a signal through an amplifier 86 to a circular chart continuous balance potentiometer type air controller 88. Controller 88 is supplied with pneumatic pressure from a header 90 having air at a pressure of, for example 25 p.s.i., through a manual valve 92 and a pressure regulator 94 the output of which is delivered a pressure of for example 20 p.s.i. to the controller 88. Controller 88 delivers to its output line 96 a variable pressure ranging from, for example, 3 to 15 p.s.i. dependent upon the amplitude of the signal supplied to its input from the amplifier 86. The pressure in the line 96 is transmitted to a pneumatic multiplier relay 98 having a multiplication ratio of for example 4 to 1. Relay 98 is supplied with high-pressure air from an input line having pressure in the order of 80 to 90 p.s.i. through a pressure regulator 100 providing an output in the order of 25 to 75 p.s.i. as indicated by the pressure gauge 102. The output of the relay 98 will vary between 12 and 60 being delivered through the line 60 and the fitting 52 to the chamber 48 (see FIG. 1) interiorly of the tube 10 of the valve of FIG. 1 or 2. In the system of FIG. 3, the pipe 24 delivers fluid at a rate between 2 to 4 gallons per minute to the ball mill feed to thereby control the $pH$ of the system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A valve assembly adapted to be introduced between opposed spaced rigid conduit open ends comprising two relatively thick-walled substantially longitudinally coextensive tubes formed primarily of elastomeric material and one disposed within the other, the inner of said tubes including an inner region and outer end regions, said inner region having an internal opening of a diameter formed to provide a substantially uniform size continuation of the fluid passageway through said conduits and having opposed end shoulders in axial abutment with said conduit ends, said outer regions having openings of slightly larger diameter and being telescoped upon said conduit ends, means defining an annular inwardly open recess in the outer tube in surrounding relation to the inner region of the inner tube to form an annular fluid pressure chamber disposed within the assembly mainly inwardly of said conduit ends, the outer regions of said tubes having a close peripheral fit with each other, means for radially clamping the tube outer regions fluidtight upon each other and upon the respective opposed conduit ends, a fluid pressure introduction fitting mounted in the wall of said outer tube at said chamber whereby fluid under pressure may be introduced into the chamber for elastically constricting the inner region of said inner tube to restrict fluid flow through the valve assembly and means providing such internal reenforcement for said outer tube that said outer tube undergoes substantially no radial expansion during normal operating pressures within said chamber and constitutes an effective housing for the valve assembly.

2. A valve assembly as defined in claim 1, wherein said internal reenforcement for the outer tube comprises a plurality of annular plies of fabric.

3. The valve assembly defined in claim 1, wherein the outer regions of said inner tube have openings substantially equal to the external diameters of said conduit ends.

4. The valve assembly defined in claim 1, wherein said inner tube has an annular band of internal reinforcing material disposed internally of each outer region thereof.

5. The valve assembly defined in claim 4, wherein the central region of said inner tube is free of internal reinforcement, being formed exclusively by elastomeric material whereby application of pressure within said annular chamber in excess of the fluid pressure within said inner tube will produce uniform circumferential constriction of the opening through the central region of said tube in substantially venturi form over the major portion of the range of constriction of the central region of said inner tube.

6. The valve assembly defined in claim 4, wherein said reinforcing material of said inner tube extends from end to end thereof in a continuous annular band to preclude material radial expansion of said inner tube central region and resultant diminution in the size of said annular chamber in response to fluid pressure within said inner tube.